(12) United States Patent
Suzuki et al.

(10) Patent No.: US 10,280,978 B2
(45) Date of Patent: May 7, 2019

(54) TAPERED ROLLER BEARING

(71) Applicant: JTEKT CORPORATION, Osaka-shi, Osaka (JP)

(72) Inventors: Akiyuki Suzuki, Nagoya (JP); Ryo Shiina, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/841,765

(22) Filed: Dec. 14, 2017

(65) Prior Publication Data

US 2018/0180092 A1  Jun. 28, 2018

(30) Foreign Application Priority Data

Dec. 22, 2016 (JP) ................................ 2016-249430

(51) Int. Cl.
*F16C 19/36* (2006.01)
*F16C 33/58* (2006.01)
*F16C 33/66* (2006.01)

(52) U.S. Cl.
CPC ........ *F16C 33/6655* (2013.01); *F16C 19/364* (2013.01); *F16C 33/586* (2013.01)

(58) Field of Classification Search
CPC .... F16C 19/364; F16C 19/383; F16C 19/385; F16C 19/386; F16C 19/388
See application file for complete search history.

(56) References Cited

U.S. PATENT DOCUMENTS

| | | | |
|---|---|---|---|
| 7,950,856 B2 * | 5/2011 | Sada ..................... | F16C 19/364 384/473 |
| 9,982,718 B2 * | 5/2018 | Suzuki .................. | F16C 19/364 |
| 2008/0219606 A1 | 9/2008 | Sada et al. | |

FOREIGN PATENT DOCUMENTS

| JP | 2008-223891 A | 9/2008 |
|---|---|---|
| JP | 2017190849 | * 10/2017 |

OTHER PUBLICATIONS

Shiina et al.; U.S. Appl. No. 15/842,351 filed Dec. 14, 2017.

\* cited by examiner

*Primary Examiner* — James Pilkington
(74) *Attorney, Agent, or Firm* — Oliff PLC

(57) ABSTRACT

In a tapered roller bearing, a large rib is provided at one end of an inner ring in the axial direction, and projects radially outward. A lubricating oil holding member is integrated with an outer ring, and disposed at a position overlapping the large rib in the radial direction. The lubricating oil holding member includes a tubular portion and an annular portion. An inclined surface is disposed on the outer peripheral surface of the large rib at one end in the axial direction. The distance from the rotational axis of the inner ring to the inclined surface becomes larger from one side in the axial direction toward the other side. An end of the inclined surface is positioned, in the axial direction, between the annular portion and one end of the outer ring in the axial direction.

4 Claims, 8 Drawing Sheets

TAPERED ROLLER BEARING

INCORPORATION BY REFERENCE

The disclosure of Japanese Patent Application No. 2016-249430 filed on Dec. 22, 2016 including the specification, drawings and abstract, is incorporated herein by reference in its entirety.

BACKGROUND OF THE INVENTION

1. Field of the Invention

The present invention relates to a tapered roller bearing, and more particularly to a tapered roller bearing in which lubricating oil is supplied to a space in which tapered rollers roll.

2. Description of the Related Art

A tapered roller bearing includes an outer ring, an inner ring, a plurality of tapered rollers, and a cage. The tapered rollers are disposed with their center axes inclined with respect to the center axis of the tapered roller bearing. At least a part of an end face (hereinafter referred to as a "large end face") of each of the tapered rollers with the larger diameter is positioned on the outer side, in the radial direction, of the bearing with respect to an end face (hereinafter referred to as a "small end face") of the tapered roller with the smaller diameter.

Regarding the properties of the tapered roller bearing, it is requested to improve the durability against seizure between the large end faces of the tapered rollers and a surface (hereinafter referred to as a "large rib surface") of the inner ring that contacts the large end faces of the tapered rollers, for example. Therefore, there is known a tapered roller bearing in which a lubricating oil holding member is attached to an outer ring and lubricating oil is stored in a space between the lubricating oil holding member and the outer ring (Japanese Patent Application Publication No. 2008-223891 (JP 2008-223891 A), for example).

Such a tapered roller bearing is assembled to a differential device etc. of an automobile, for example, and disposed inside a housing. When the differential device is driven, a part of lubricating oil stored in the lower part of the tapered roller bearing is scattered to flow toward the outside of the tapered roller bearing. When lubricating oil stored in the lower part of the tapered roller bearing is reduced, the resistance against seizure of the tapered roller bearing may be lowered.

SUMMARY OF THE INVENTION

An object of the present invention is to provide a tapered roller bearing that allows suppressing a reduction of lubricating oil stored in the lower part of the tapered roller bearing.

An aspect of the present invention provides a tapered roller bearing that includes an outer ring, an inner ring, a plurality of tapered rollers, a cage, and a lubricating oil holding member. The inner ring includes a large rib and a small rib. The large rib is provided at an end portion of the inner ring on one side in an axial direction to project radially outward. The small rib is provided at an end portion of the inner ring on the other side in the axial direction to project radially outward. The plurality of tapered rollers are disposed between the outer ring and the inner ring. The cage holds the plurality of tapered rollers at intervals in a circumferential direction. The lubricating oil holding member is provided on one side, in the axial direction, of the outer ring, and disposed at a position overlapping the large rib as seen in a radial direction. The lubricating oil holding member includes a tubular portion and an annular portion. The tubular portion extends in the axial direction, and is positioned at an end portion of the outer ring on one side in the axial direction. The annular portion extends radially inward from an end portion of the tubular portion on one side in the axial direction. The large rib includes an inclined surface. The inclined surface is disposed on an outer peripheral surface of the large rib at an end portion on one side in the axial direction. The distance from a rotational axis of the inner ring to the inclined surface becomes larger from one side in the axial direction toward the other side in the axial direction. An end portion of the inclined surface on the other side in the axial direction is positioned, in the axial direction, between the annular portion and an end portion of the outer ring on one side in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
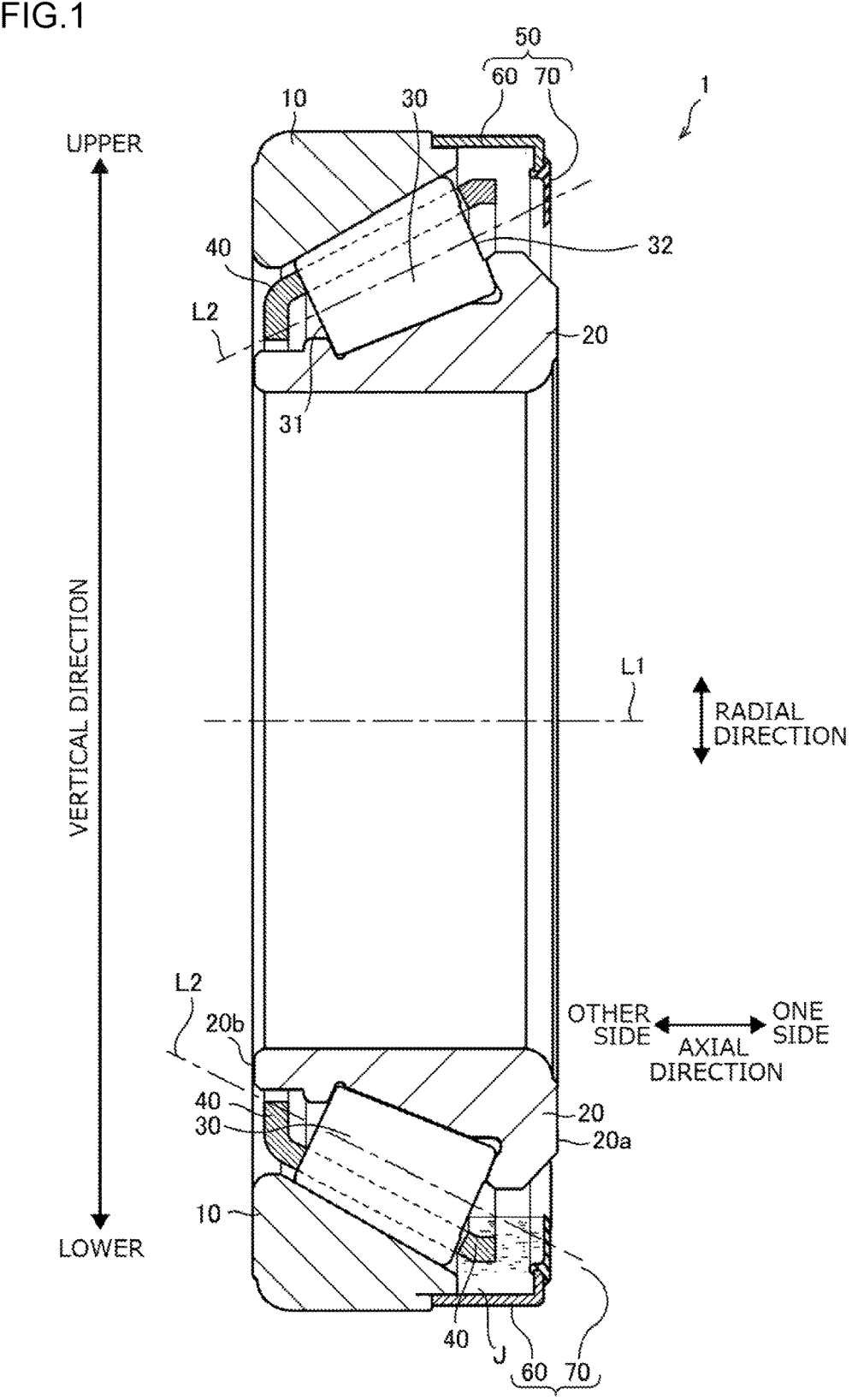
FIG. 1 is a sectional view of a tapered roller bearing according to an embodiment of the present invention.

An embodiment of the present invention will be described in detail below with reference to the drawings. In the drawings, the same or corresponding portions are given the same reference numerals to omit description.

In the drawings referenced in the following description, only main members of the embodiment of the present invention that are necessary to describe the present invention are illustrated for convenience of description. Thus, the present invention may include optional constituent members that are not illustrated in the drawings. The members in the drawings do not faithfully reflect the actual dimensions, the dimensional ratios among the members, etc.

FIG. 1 is a sectional view of a tapered roller bearing 1 according to an embodiment of the present invention. FIG. 1 is a sectional view taken along a center axis L1 of the tapered roller bearing 1. Herein, the term "axial direction", when used alone, means the direction in which the center axis L1 extends.

As illustrated in FIG. 1, the tapered roller bearing 1 includes an outer ring 10, an inner ring 20, a plurality of tapered rollers 30, a cage 40, and a lubricating oil holding member 50. The outer ring 10, the inner ring 20, the cage 40, and the lubricating oil holding member 50 are annular members disposed coaxially with the center axis L1 of the tapered roller bearing 1.

As illustrated in FIG. 1, the outer ring 10 and the inner ring 20 are disposed such that the inner ring 20 is fitted on the inner side, in the radial direction, of the outer ring 10. The plurality of tapered rollers 30 are disposed in a space interposed between the outer ring 10 and the inner ring 20 in the radial direction. The cage 40 holds the plurality of tapered rollers 30 at intervals in the circumferential direction. The lubricating oil holding member 50 is attached to an end portion of the outer ring 10 on one side in the axial direction.

The tapered rollers 30 each have a truncated cone shape. A center axis L2 of the tapered roller 30 is inclined with respect to the center axis L1. The center axis L2 extends away from the center axis L1 as the center axis L2 extends from an end face 31 (hereinafter referred to as a "small end face 31") of the tapered roller 30 on the small diameter side toward an end face 32 (hereinafter referred to as a "large end face 32") on the large diameter side.

In the following description herein, the side on which the large end face 32 of the tapered roller 30 is disposed in the axial direction is referred to as one side in the axial direction, and the side on which the small end face 31 of the tapered roller 30 is disposed is referred to as the other side in the axial direction. In other words, the right side of the sheet surface of FIG. 1 is referred to as one side in the axial direction, and the left side of the sheet surface is referred to as the other side in the axial direction. The vertical direction of the tapered roller bearing 1 corresponds to the vertical direction of the sheet surface of FIG. 1, and is parallel to the radial direction of the tapered roller bearing 1. The upper part of the sheet surface of FIG. 1 corresponds to the upper part of the tapered roller bearing 1. The lower part of the sheet surface of FIG. 1 corresponds to the lower part of the tapered roller bearing 1.

Figure 2:
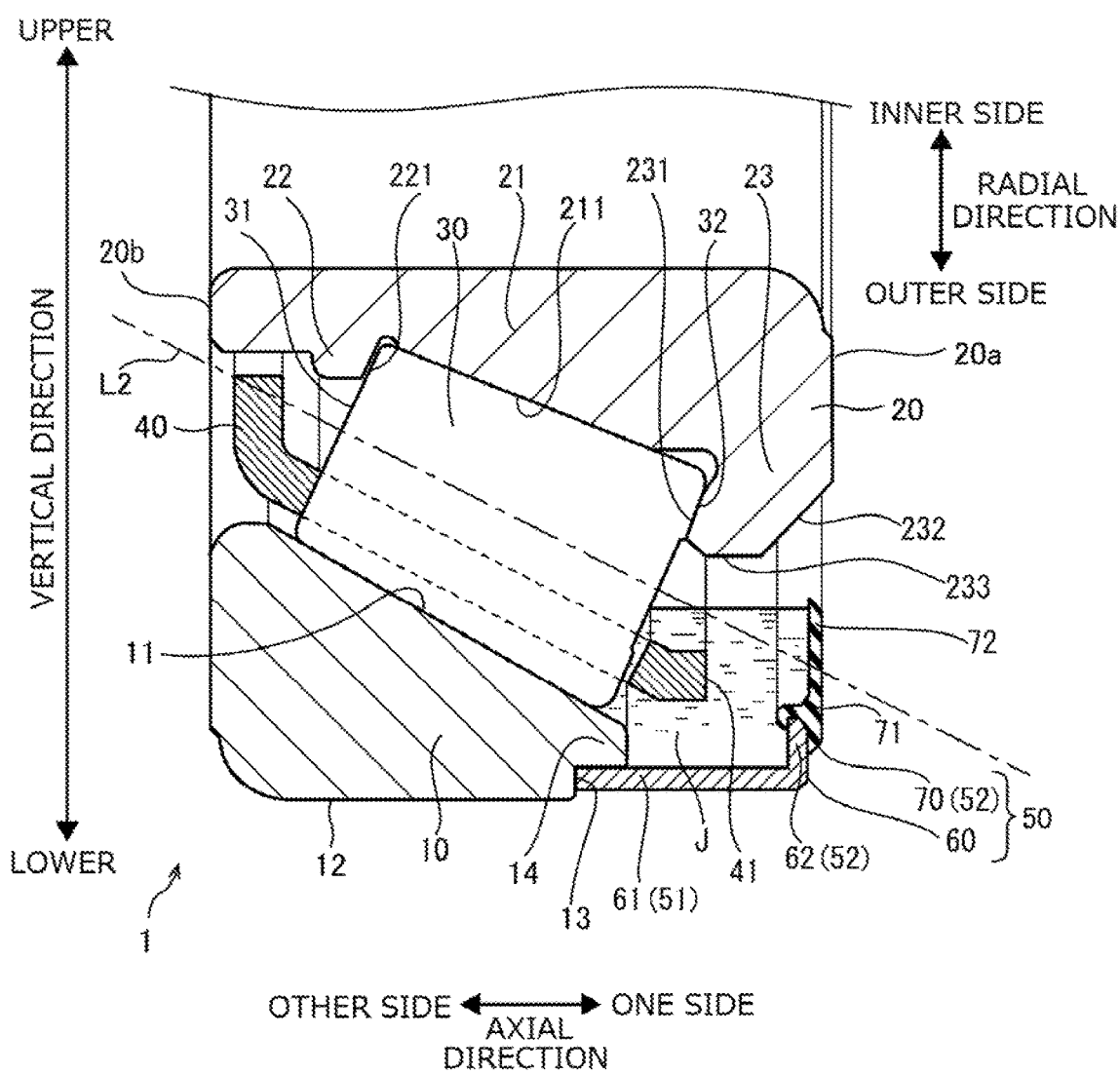
FIG. 2 is an enlarged view of the lower part of the tapered roller bearing illustrated in FIG. 1.

FIG. 2 is an enlarged sectional view of a part of the tapered roller bearing 1. As illustrated in FIG. 2, the outer ring 10 has a first raceway surface 11 on the inner peripheral surface thereof. The first raceway surface 11 has a tapered shape in which the distance from the center axis L1 to the first raceway surface 11 becomes larger from the other side in the axial direction toward one side in the axial direction.

An annular stepped surface 13 is formed along the circumferential direction on an outer peripheral surface 12 of the outer ring 10. The stepped surface 13 is formed on one side in the axial direction with respect to the center portion of the outer ring 10 in the axial direction. The stepped surface 13 is parallel to a plane that is perpendicular to the axial direction. That is, the stepped surface 13 has an annular shape as seen in the axial direction. An end portion of the outer ring 10 on one side in the axial direction with respect to the stepped surface 13 is a thin-walled portion 14 that is thinner in the radial direction than the other side in the axial direction.

The inner ring 20 includes a body portion 21, a cone front face rib (hereinafter referred to as a small rib) 22, and a cone back face rib (hereinafter referred to as a large rib) 23. A front surface 20a of the inner ring 20 is an end face on one side in the axial direction. A back surface 20b of the inner ring 20 is an end face on the other side in the axial direction.

The body portion 21 has a tubular shape, and is disposed between the small rib 22 and the large rib 23 in the axial direction. The body portion 21 has a second raceway surface 211 on the outer peripheral surface thereof. The second raceway surface 211 has a tapered shape in which the distance from the center axis L1 to the second raceway surface 211 becomes larger from the other side in the axial direction toward one side in the axial direction.

The small rib 22 is provided at an end portion of the inner ring 20 on the other side in the axial direction, and disposed on the other side in the axial direction with respect to the body portion 21. The small rib 22 projects radially outward with respect to an end portion of the second raceway surface 211 on the other side in the axial direction. The small rib 22 has a guide surface 221 that faces the small end face 31 of the tapered roller 30. The guide surface 221 has an annular shape as seen in the axial direction.

Figure 3:
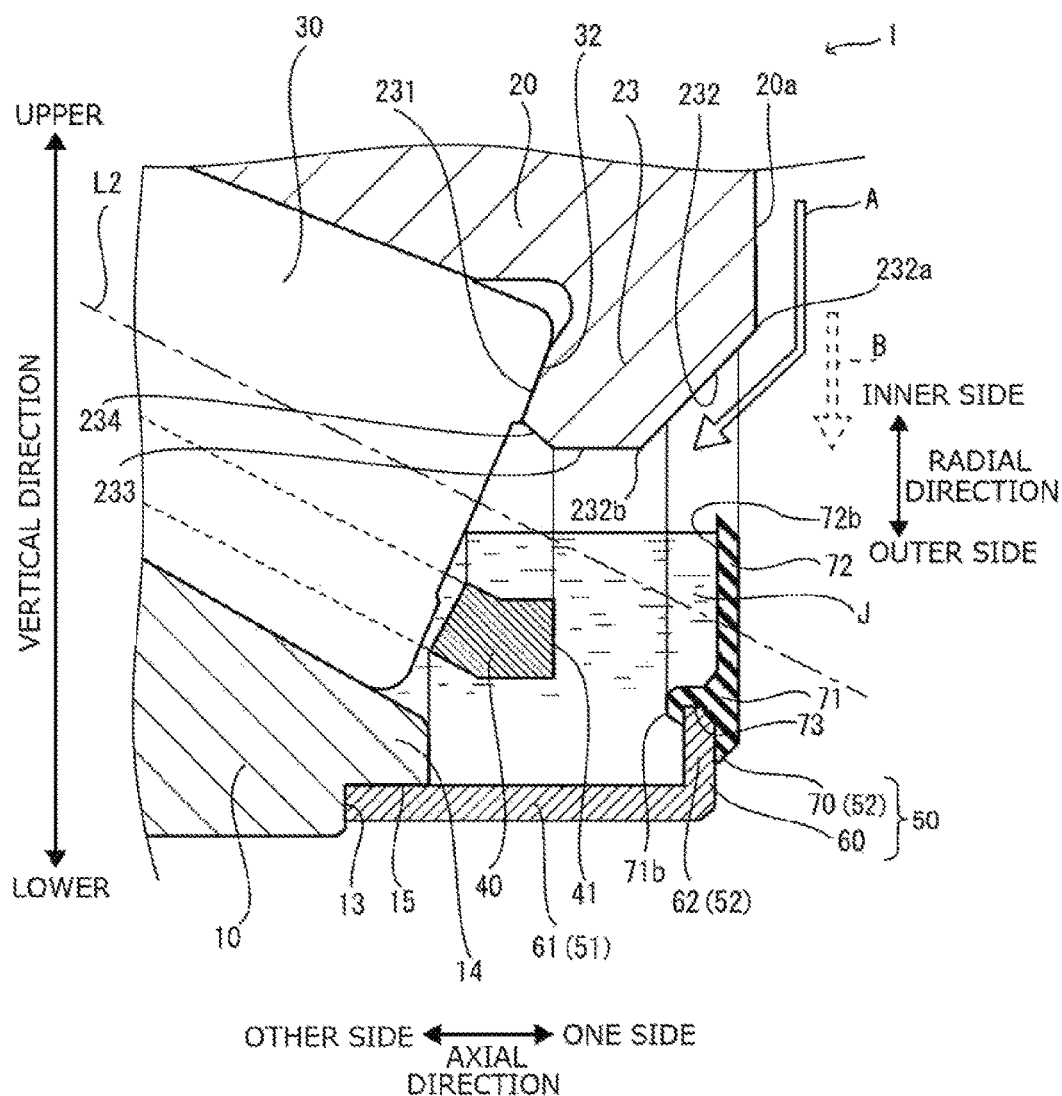
FIG. 3 is an enlarged view of the vicinity of a large rib of the tapered roller bearing illustrated in FIG. 2.

FIG. 3 is an enlarged sectional view of the vicinity of the large rib 23 of the tapered roller bearing 1 illustrated in FIG. 2. As illustrated in FIG. 3, the large rib 23 is provided at an end portion of the inner ring 20 on one side in the axial direction, and disposed on one side in the axial direction with respect to the body portion 21. The large rib 23 projects radially outward with respect to an end portion of the second raceway surface 211 on one side in the axial direction. The large rib 23 is disposed at a position overlapping the lubricating oil holding member 50 as seen in the radial direction.

The large rib 23 has a guide surface 231 that faces the large end face 32 of the tapered roller 30. The guide surface 231 has an annular shape as seen in the axial direction. The guide surface 231 is inclined with respect to the center axis L1, and has a tapered shape in which the distance from the center axis L1 to the guide surface 231 becomes smaller from the other side in the axial direction toward one side in the axial direction.

The large rib 23 has inclined surfaces 232 and 234 and a parallel surface 233 on the outer peripheral surface thereof.

The inclined surface 232 is inclined with respect to the center axis L1. An end portion 232a of the inclined surface 232 on one side in the axial direction is continuous with an end portion of the front surface 20a of the inner ring 20 on the outer side in the radial direction. An end portion 232b of the inclined surface 232 on the other side in the axial direction is continuous with an end portion of the parallel surface 233 on one side in the axial direction. The inclined surface 232 is an annular surface as seen in the axial direction. The inclined surface 232 has a tapered shape in which the distance from the center axis L1 to the inclined surface 232 becomes smaller from the other side in the axial direction toward one side in the axial direction. That is, the inclined surface 232 is reduced in diameter from the other side in the axial direction toward one side in the axial direction.

An end portion 232b of the inclined surface 232 on the other side in the axial direction is positioned, in the axial direction, between the cage 40 and an elastic lip 70 of the lubricating oil holding member 50. In other words, the end portion 232b of the inclined surface 232 on the other side in the axial direction is disposed at a position not overlapping the cage 40 as seen in the radial direction.

The parallel surface 233 is an inner peripheral surface around the center axis L1. The intersection line between the parallel surface 233 and a parallel surface that passes through the center axis L1 is a line that is parallel to the center axis L1. The parallel surface 233 is positioned, in the axial direction, between the inclined surface 232 and the inclined surface 234.

The inclined surface 234 is inclined with respect to the center axis L1. The inclined surface 234 has a tapered shape in which the distance from the center axis L1 to the inclined surface 234 becomes smaller from one side in the axial direction toward the other side in the axial direction. An end portion of the inclined surface 234 on one side in the axial direction is continuous with an end portion of the parallel surface 233 on the other side in the axial direction. An end portion of the inclined surface 234 on the other side in the axial direction is continuous with an end portion of the guide surface 231 on the other side in the axial direction.

As illustrated in FIG. 3, the lubricating oil holding member 50 includes a ring 60 and the elastic lip 70.

The ring 60 includes a ring body 61 in a cylindrical shape, and an annular lug 62 that projects radially inward from the inner peripheral surface of the ring body 61. The ring body 61 and the lug 62 are formed integrally with each other. The inside diameter of the ring body 61 is determined such that the ring body 61 can be press-fitted with the outer side of an outer peripheral surface 15 of the thin-walled portion 14 of the outer ring 10. The lug 62 is formed at an end portion of the ring body 61 on one side in the axial direction. The inner peripheral surface of the ring body 61 will be discussed in detail later.

The elastic lip 70 has a circular ring shape as a whole. A portion of the elastic lip 70 that constitutes the outer side in the radial direction is a thick-walled portion 71, which is thicker in the axial direction than the lug 62 of the ring 60. A portion of the elastic lip 70 that constitutes the inner side in the radial direction is a thin-walled portion 72, which is thinner in the axial direction than the thick-walled portion 71. A surface 72b of the thin-walled portion 72 on the other side in the axial direction is positioned on one side in the axial direction with respect to the end portion 232b of the inclined surface 232 on the other side in the axial direction. The elastic lip 70 is formed of rubber such as nitrile rubber or acrylic rubber, for example.

The thick-walled portion 71 and the thin-walled portion 72 of the elastic lip 70 are formed continuously and integrally with each other. On a surface of the elastic lip 70 on the other side in the axial direction, a surface 71b of the thick-walled portion 71 is positioned on the other side in the axial direction with respect to the surface 72b of the thin-walled portion 72.

The thick-walled portion 71 is formed with a groove 73 that extends from the outer side toward the inner side in the radial direction. The groove 73 is formed over the entire circumference of the thick-walled portion 71. The groove 73 is set to such a size that enables the lug 62 of the ring 60 to be fitted therein. By fitting the lug 62 into the groove 73, the ring 60 and the elastic lip 70 are combined with each other to constitute the lubricating oil holding member 50.

With the ring 60 and the elastic lip 70 combined with each other, the lubricating oil holding member 50 as a whole has a shape in which a tubular portion 51 and an annular portion 52 in a circular ring shape are integral with each other. The tubular portion 51 corresponds to the ring body 61 of the ring 60. The tubular portion 51 extends in the axial direction, and is provided at an end portion of the outer ring 10 on one side in the axial direction. The annular portion 52 corresponds to the lug 62 of the ring 60 and the elastic lip 70. The annular portion 52 extends radially inward from an end portion of the tubular portion 51 on one side in the axial direction. The annular portion 52 is closer to the small rib 22, in the axial direction, than the front surface 20a of the inner ring 20. In other words, the annular portion 52 is positioned between the end portion 232a of the inclined surface 232 on one side in the axial direction and the end portion 232b of the inclined surface 232 on the other side in the axial direction.

As illustrated in FIG. 2, the ring 60 of the lubricating oil holding member 50 is fitted with an end portion of the outer ring 10 on one side in the axial direction such that the inner peripheral surface of the ring body 61 contacts, in the radial direction, the outer peripheral surface of the thin-walled portion 14 of the outer ring 10. Consequently, the lubricating oil holding member 50 is fixed so as to be integral with the outer ring 10.

Figure 4:
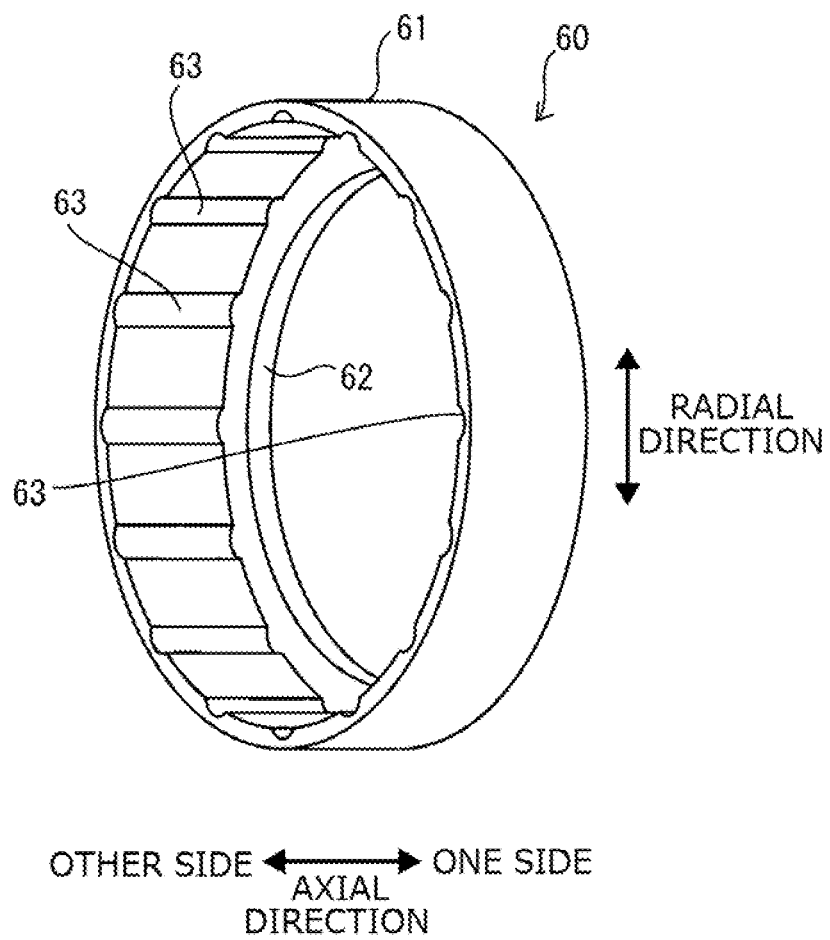
FIG. 4 is a perspective view of a ring that constitutes a lubricating oil holding member illustrated in FIG. 1.

FIG. 4 is a perspective view of the ring 60 which constitutes the lubricating oil holding member 50. As illustrated in FIG. 4, a plurality of recessed portions 63 are formed in the inner peripheral surface of the ring body 61. The plurality of recessed portions 63 which are formed in the inner peripheral surface of the ring body 61 are not illustrated in FIGS. 1 to 3. The plurality of recessed portions 63 are grooves that open inward in the radial direction and that extend in the axial direction. The plurality of recessed portions 63 may not be formed to extend from an end portion of the ring 60 on one side in the axial direction to an end portion on the other side in the axial direction. Lubricating oil J is charged into recessed portions 63, of the plurality of recessed portions 63, that are positioned in the lower part of the tapered roller bearing 1.

In FIG. 4, the plurality of recessed portions 63 are formed at equal intervals in the circumferential direction. However, the recessed portions 63 are preferably formed in at least a space other than the space in which the lubricating oil J is accumulated. In FIG. 4, the plurality of recessed portions 63 have an arcuate shape in a cross-sectional surface that is perpendicular to the axial direction. However, the present invention is not limited thereto. The plurality of recessed portions 63 may be grooves that extend not only in the axial direction but also in the circumferential direction.

As illustrated in FIG. 3, the lubricating oil J is stored in a space formed between the outer ring 10 and the lubricating oil holding member 50 in the lower part of the tapered roller bearing 1. That is, the lubricating oil J remains in the lower part of the tapered roller bearing 1. The height of the liquid surface of the lubricating oil J is generally the same as the height of a portion of an end portion of the elastic lip 70 on the inner side in the radial direction that is positioned in the lowermost part of the tapered roller bearing 1. In other words, the height of the liquid surface of the lubricating oil J is generally the same as the height of the upper end of a portion of the elastic lip 70 that is positioned in the lowermost part of the tapered roller bearing 1.

When the tapered roller bearing 1 is stationary, the lubricating oil J contacts a part of the outer ring 10, a part of the tapered roller 30, and a part of the cage 40. When the tapered roller bearing 1 is rotated, the lubricating oil J which is accumulated in the lower part of the tapered roller bearing 1 is splashed along with the rotation. The lubricating oil J which has been splashed makes its way into a space between the guide surface 231 of the large rib 23 and the large end face 32 of the tapered roller 30, for example. Consequently, friction caused between the guide surface 231 of the large rib 23 and the large end face 32 of the tapered roller 30 is reduced.

The tapered roller bearing 1 is assembled to a differential device etc. of an automobile, for example, and disposed inside a housing (not illustrated).

The tapered roller bearing 1 is rotated along with drive of the differential device. Consequently, a part of the lubricating oil J which is accumulated in the lower part of the tapered roller bearing 1 flows toward the outside of the tapered roller bearing 1. In the case where the amount of the lubricating oil J which is accumulated in the lower part of the tapered roller bearing 1 is reduced, the resistance against seizure of the tapered roller bearing 1 may be lowered. In order to suppress a reduction in the resistance against seizure of the tapered roller bearing 1, it is necessary that the lubricating oil J which has flowed toward the outside of the tapered roller bearing 1 should be caused to flow into a space between the outer ring 10 and the lubricating oil holding member 50 in the lower part of the tapered roller bearing 1 to be collected.

In FIG. 3, the arrow A indicates a path along which the lubricating oil J which has adhered to the front surface 20a of the inner ring 20 flows in the tapered roller bearing 1.

As discussed above, a part of the lubricating oil J which is stored in the lower part of the tapered roller bearing 1 flows toward the outside of the tapered roller bearing 1. A part of the lubricating oil J which has flowed toward the outside of the tapered roller bearing 1 adheres to the front surface 20a of the inner ring 20. In the case where the differential device is disposed on one side, in the axial direction, of the tapered roller bearing 1, lubricating oil scattered from the differential device occasionally adheres to the front surface 20a of the inner ring 20.

The lubricating oil J which has adhered to the front surface 20a of the inner ring 20 is moved radially outward along the front surface 20a by a centrifugal force generated by rotation of the inner ring 20. In the case where the lubricating oil J is moved to an end portion of the front surface 20a of the inner ring 20 on the outer side in the radial direction, the lubricating oil J is urged to be further moved radially outward by a centrifugal force generated by rotation of the inner ring 20. In this event, the lubricating oil J is moved radially outward along the inclined surface 232 because of the surface tension of the lubricating oil J without being scattered radially outward from an end portion of the front surface 20a of the inner ring 20 on the outer side in the radial direction. After the lubricating oil J is moved to the end portion 232b of the inclined surface 232 on the other side in the axial direction, the lubricating oil J falls into a space between the outer ring 10 and the lubricating oil holding member 50 in the lower part of the tapered roller bearing 1 because of the centrifugal force due to rotation of the inner ring 20.

The arrow B indicates a path along which the lubricating oil J flows on the assumption that the large rib 23 of the inner ring 20 does not have the inclined surface 232. On the assumption that the large rib 23 of the inner ring 20 does not have the inclined surface 232, a boundary portion is formed by the front surface 20a of the inner ring 20 and the parallel surface 233, and extends vertically. That is, the parallel surface 233 in this case is assumed to be different in size in the axial direction from the parallel surface illustrated in FIG. 3, and to extend to an end portion of the inner ring 20 on one side in the axial direction to be connected to the front surface 20a. In this case, the lubricating oil J which is moved to an end portion of the front surface 20a of the inner ring 20 on the outer side in the radial direction is scattered radially outward by a centrifugal force generated by rotation of the inner ring 20 as indicated by the arrow B. As a result, the lubricating oil J which has adhered to the front surface 20a of the inner ring 20 cannot be collected in the tapered roller bearing in which the large rib 23 does not have the inclined surface 232. Therefore, a reduction of the lubricating oil J which is stored in the space between the outer ring 10 and the lubricating oil holding member 50 in the lower part of the tapered roller bearing 1 cannot be suppressed.

In contrast, the large rib 23 has the inclined surface 232 as discussed above. Therefore, the lubricating oil J which has adhered to the front surface 20a of the inner ring 20 passes along the path of the arrow A, to be collected efficiently. With the tapered roller bearing 1, a reduction of the lubricating oil J which is stored in the space between the outer ring 10 and the lubricating oil holding member 50 in the lower part of the tapered roller bearing 1 can be suppressed, improving the resistance against seizure.

As illustrated in FIG. 3, the end portion 232b of the inclined surface 232 on the other side in the axial direction is disposed at a position not overlapping the cage 40 as seen in the radial direction. Consequently, generation of abnormal sound and a reduction in the life of the tapered roller bearing 1 can be prevented. The reason for such prevention will be described below.

A case where the end portion 232b of the inclined surface 232 on the other side in the axial direction is disposed at a position overlapping the cage 40 as seen in the radial direction is considered. In this case, in the case where the lubricating oil J which is stored in the space between the outer ring 10 and the lubricating oil holding member 50 in the lower part of the tapered roller bearing 1 is reduced and the cage 40 is exposed in the space, the lubricating oil J may be directly dropped onto the cage 40 from the end portion 232b of the inclined surface 232 on the other side in the axial direction. In the case where the lubricating oil J contains foreign matter such as dust from the outside and abrasion powder of the tapered rollers 30, the foreign matter is dropped onto the cage 40 together with the lubricating oil J. Abnormal sound may be generated or the life of the tapered roller bearing 1 may be reduced when foreign matter directly dropped onto the cage 40 makes its way into a space between the first raceway surface 11 of the outer ring 10 and the tapered rollers 30 or a space between the second raceway surface 211 of the inner ring 20 and the tapered rollers 30.

Meanwhile, as illustrated in FIG. 3, the end portion 232b of the inclined surface 232 on the other side in the axial direction is positioned between an end face 41 of the cage 40 on one side in the axial direction and the surface 72b of the elastic lip 70 on the other side in the axial direction in the axial direction. Thus, dropping of the lubricating oil J onto the cage 40 is suppressed. Foreign matter contained in the lubricating oil J is precipitated in a space between the outer ring 10 and the lubricating oil holding member 50 in the lower part of the tapered roller bearing 1 without contacting the cage 40. Foreign matter can be prevented from being caught between the first raceway surface 11 of the outer ring 10 and the tapered rollers 30 or between the second raceway surface 211 of the inner ring 20 and the tapered rollers 30 together with the lubricating oil J while the tapered rollers 30 are rotating. Therefore, generation of abnormal sound and a reduction in the life of the tapered roller bearing 1 can be suppressed.

As illustrated in FIG. 4, the plurality of recessed portions 63 are formed in the inner peripheral surface of the ring 60, preventing foreign matter from flowing into a space between the outer ring 10 and the lubricating oil holding member 50 in the lower part of the tapered roller bearing 1 together with the lubricating oil J. The lubricating oil J which has adhered to the front surface 20a of the inner ring 20 reaches the end portion 232b of the inclined surface 232 on the other side in the axial direction along the front surface 20a of the inner ring 20 and the inclined surface 232 because of a centrifugal force generated by rotation of the inner ring 20. After the lubricating oil J reaches the end portion 232b of the inclined surface 232 on the other side in the axial direction, the lubricating oil J is further scattered radially outward by the centrifugal force.

A portion of the lubricating oil J which has been scattered to a space other than the space in which the lubricating oil J is stored hits the inner peripheral surface of the ring body 61, and is moved downward in the tapered roller bearing 1 along the inner peripheral surface of the ring body 61. Foreign matter contained in the lubricating oil J remains in the recessed portions when the lubricating oil J flows downward in the tapered roller bearing 1 on the inner peripheral surface of the ring 60. Therefore, foreign matter being finally caught on the outer peripheral surfaces (rolling surfaces) of the tapered rollers 30 is suppressed even in the case where foreign matter flows into a space between the outer ring 10 and the lubricating oil holding member 50 in the lower part of the tapered roller bearing 1. Foreign matter can be prevented from being caught between the first raceway surface 11 of the outer ring 10 and the tapered rollers 30 or between the second raceway surface 211 of the inner ring 20 and the tapered rollers 30. As a result, generation of abnormal sound and a reduction in the life of the tapered roller bearing 1 can be suppressed.

The annular portion 52 of the lubricating oil holding member 50 is positioned closer to the small rib 22, in the axial direction, than the front surface 20a of the inner ring 20. The lubricating oil holding member 50 does not project toward one side in the axial direction with respect to the inner ring 20. Therefore, a device or a member disposed on the one side, in the axial direction, of the tapered roller bearing 1 can be disposed in contact with the front surface 20a of the inner ring 20. Consequently, the degree of freedom in design of a device that uses the tapered roller bearing 1 can be improved.

Figure 5:
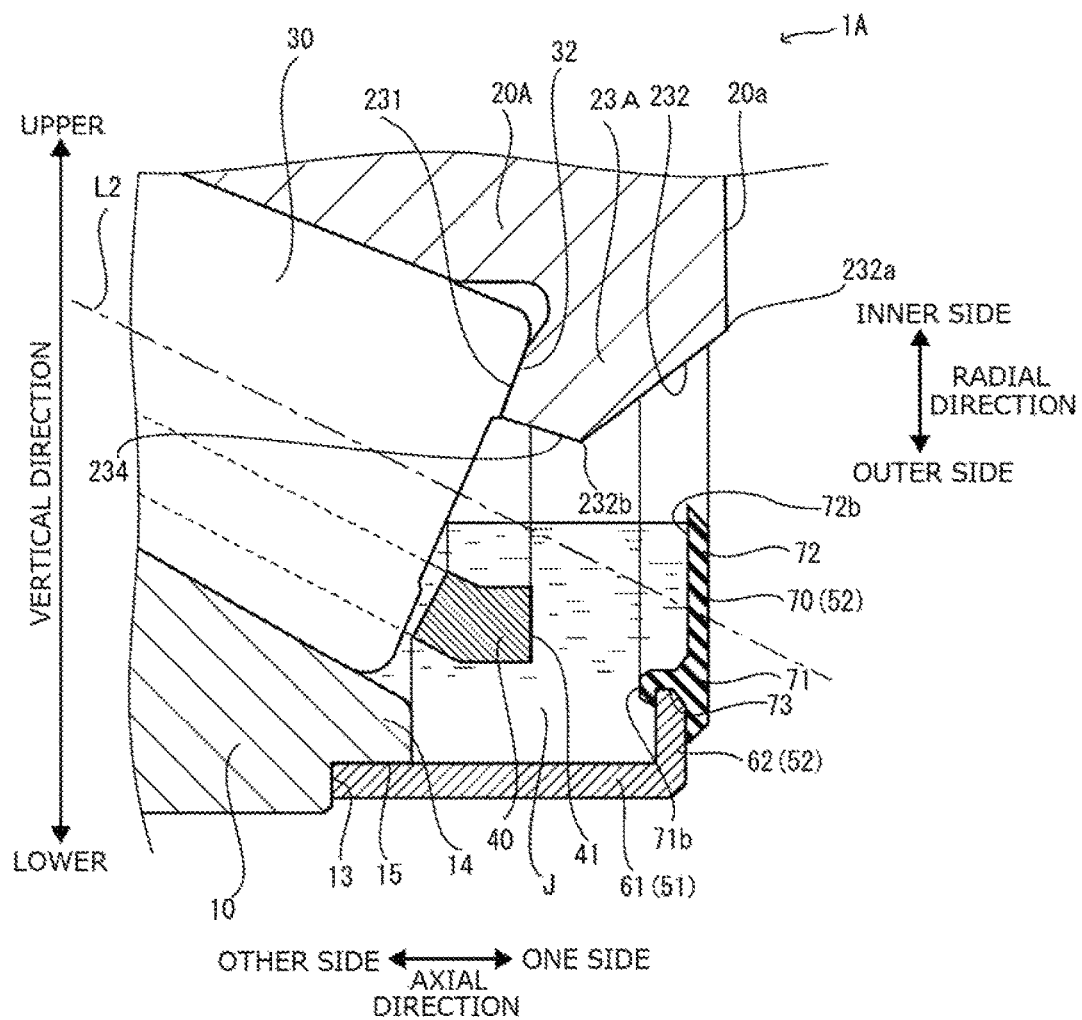
FIG. 5 is an enlarged sectional view illustrating the vicinity of a large rib of a tapered roller bearing according to a first modification of the embodiment of the present invention.

FIG. 5 is an enlarged sectional view of a part of a tapered roller bearing 1A according to a first modification. As illustrated in FIG. 5, the tapered roller bearing 1A has the same configuration as that of the tapered roller bearing 1 except for including an inner ring 20A in place of the inner ring 20 of the tapered roller bearing 1.

The inner ring 20A includes a large rib 23A. The large rib 23A has the inclined surfaces 232 and 234 on the outer peripheral surface of the large rib 23A. That is, the parallel surface 233 is not disposed on the outer peripheral surface of the inner ring 20A. Also in this case, the lubricating oil J which has adhered to the front surface 20a of the inner ring 20A can flow into a space between the outer ring 10 and the lubricating oil holding member 50 in the lower part of the tapered roller bearing 1A from the front surface 20a along the inclined surface 232 as in the tapered roller bearing 1. Thus, with the tapered roller bearing 1A, the lubricating oil J which has adhered to the front surface 20a of the inner ring 20A can be collected efficiently.

Figure 6:
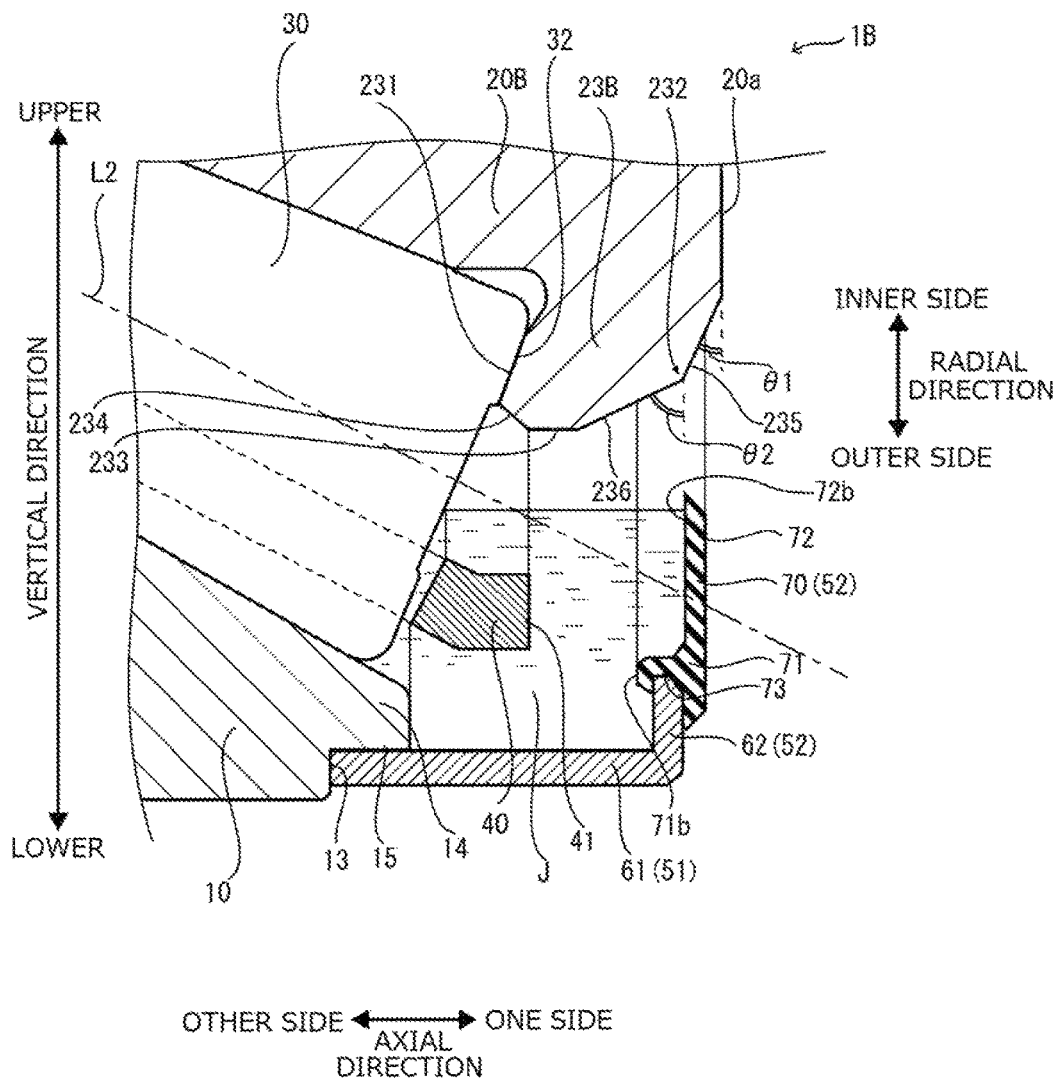
FIG. 6 is an enlarged sectional view illustrating the vicinity of a large rib of a tapered roller bearing according to a second modification of the embodiment of the present invention.

FIG. 6 is an enlarged sectional view of a part of a tapered roller bearing 1B according to a second modification. As illustrated in FIG. 6, the tapered roller bearing 1B has the same configuration as that of the tapered roller bearing 1 except for including an inner ring 20B in place of the inner ring 20 of the tapered roller bearing 1.

The inner ring 20B includes a large rib 23B. The large rib 23B has inclined surfaces 235 and 236, in place of the inclined surface 232, on the outer peripheral surface of the large rib 23B.

The inclined surface 235 is disposed between the front surface 20a of the inner ring 20B and the inclined surface 236 in the axial direction. An end portion of the inclined surface 235 on one side in the axial direction is continuous with an end portion of the front surface 20a of the inner ring 20B on the outer side in the radial direction. An end portion of the inclined surface 235 on the other side in the axial direction is continuous with an end portion of the inclined surface 236 on one side in the axial direction.

The inclined surface 236 is disposed between the parallel surface 233 and the inclined surface 235 in the axial direction. An end portion of the inclined surface 236 on the other side in the axial direction is continuous with an end portion of the parallel surface 233 on one side in the axial direction. An angle θ1 is formed between the inclined surface 235 and the front surface 20a. An angle θ2 is formed between the inclined surface 236 and the front surface 20a. The angle θ2 is larger than the angle θ1.

As illustrated in FIG. 6, the angle formed between a portion of the outer peripheral surface of the inner ring 20B on one side in the axial direction and the front surface 20a becomes larger toward the outer side in the radial direction. Consequently, the lubricating oil J which has been moved to an end portion of the front surface 20a on the outer side in the radial direction can be efficiently moved to a portion at which the inclined surfaces 235 and 236 are continuous with each other. As a result, lubricating oil outside the tapered roller bearing 1B can be collected efficiently.

Figure 7:
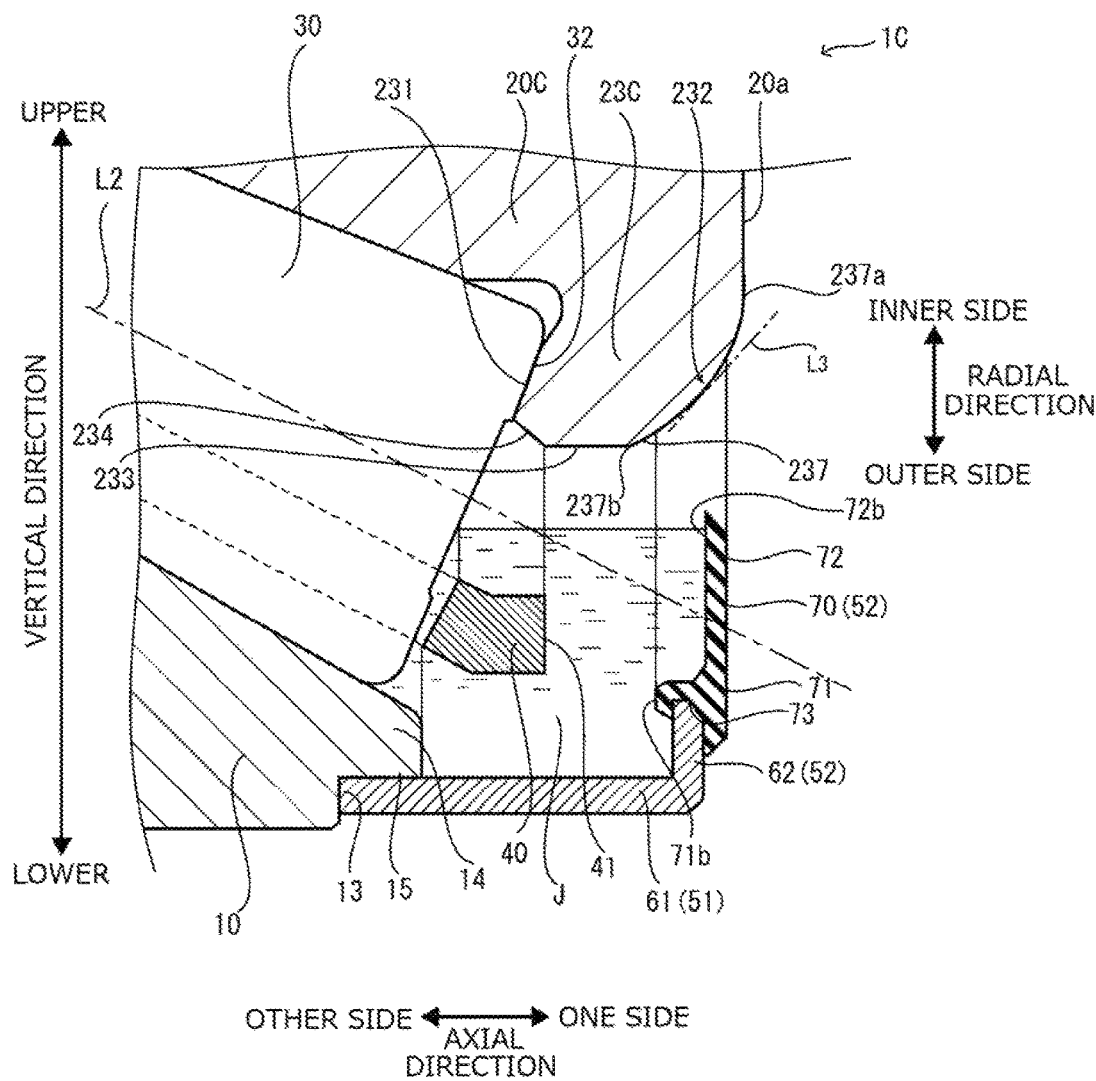
FIG. 7 is an enlarged sectional view illustrating the vicinity of a large rib of a tapered roller bearing according to a third modification of the embodiment of the present invention.

FIG. 7 is an enlarged sectional view of a part of a tapered roller bearing 1C according to a third modification. As illustrated in FIG. 7, the tapered roller bearing 1C has the same configuration as that of the tapered roller bearing 1 except for including an inner ring 20C in place of the inner ring 20 of the tapered roller bearing 1.

The inner ring 20C includes a large rib 23C. The large rib 23C has an inclined surface 237, in place of the inclined surface 232, on the outer peripheral surface of the large rib 23C. An end portion 237a of the inclined surface 237 on one side in the axial direction is continuous with an end portion of the front surface 20a of the inner ring 20C on the outer side in the radial direction. An end portion 237b of the inclined surface 237 on the other side in the axial direction is continuous with an end portion of the parallel surface 233 on one side in the axial direction.

The inclined surface 237 is a curved surface that is convex radially outward in the axial direction. That is, the angle formed between the front surface 20a and an axial component of a tangent L3 to the inclined surface 237 becomes larger toward the outer side in the radial direction. Consequently, the lubricating oil J which has been moved to an end portion of the front surface 20a of the inner ring 20C on the outer side in the radial direction can be efficiently moved to the inclined surface 237. As a result, lubricating oil outside the tapered roller bearing 1C can be collected efficiently.

In the tapered roller bearing 1, the end portion 232b of the inclined surface 232 on the other side in the axial direction is disposed at a position not overlapping the cage 40 as seen in the radial direction. However, the present invention is not limited thereto. In the tapered roller bearing 1, the end portion 232b of the inclined surface 232 on the other side in the axial direction may be disposed at a position overlapping the cage 40 as seen in the radial direction. Also in this case, the lubricating oil J which has adhered to the front surface 20a of the inner ring 20 can be collected efficiently.

That is, in the tapered roller bearing according to the present invention, it is only necessary that the large rib 23 should include an inclined surface which is disposed on the outer peripheral surface of the large rib 23 at an end portion on one side in the axial direction and the distance to which from the rotational axis of the inner ring becomes larger from one side in the axial direction toward the other side in the axial direction. It is only necessary that an end portion of the inclined surface on the other side in the axial direction should be positioned, in the axial direction, between an end portion of the outer ring 10 on one side in the axial direction and the annular portion 52 of the lubricating oil holding member 50.

Figure 8:
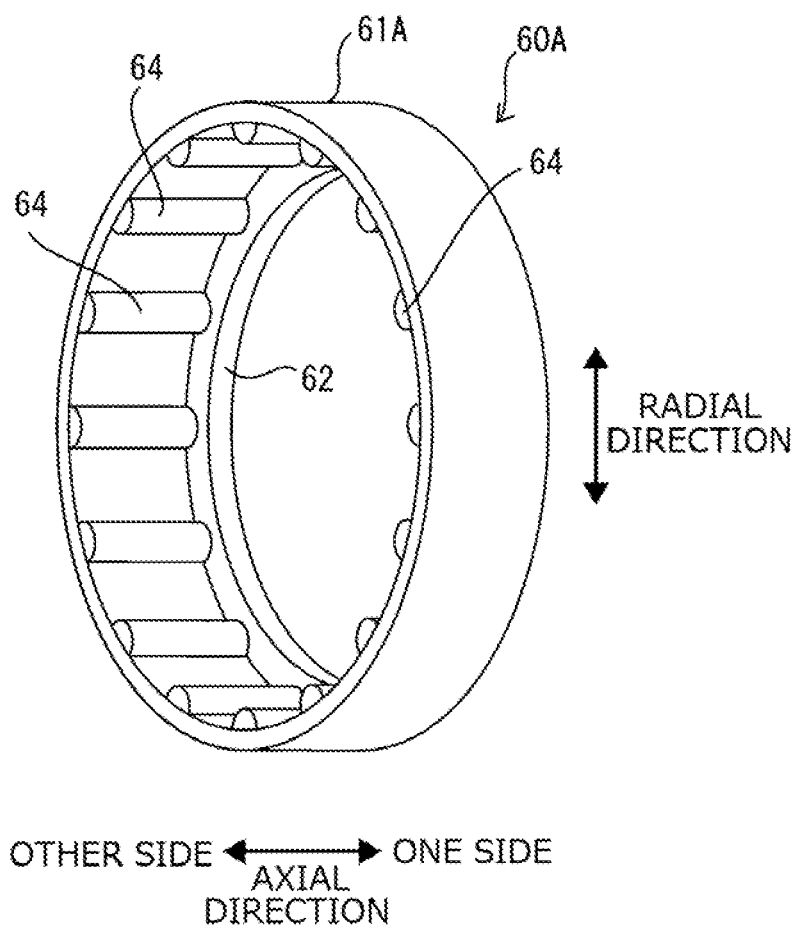
FIG. 8 is a perspective view of a ring that constitutes a lubricating oil holding member according to another modification of the embodiment of the present invention.

FIG. 8 is a perspective view of a ring 60A according to a fourth modification. The lubricating oil holding member 50 may include a ring 60A illustrated in FIG. 8, in place of the ring 60 illustrated in FIG. 4.

As illustrated in FIG. 8, the ring 60A includes a ring body 61A and a lug 62. The ring body 61A has a tubular shape, and has a plurality of projecting portions 64 on the inner peripheral surface of the ring body 61A. The projecting portions 64 extend in the axial direction, and are disposed at equal intervals in the circumferential direction. The projecting portions 64 are provided to extend from one side of the ring 60A in the axial direction to an end portion on the other side in the axial direction. Consequently, foreign matter can be prevented from flowing to the lower part of the tapered roller bearing 1 when the lubricating oil J flows in the circumferential direction along the inner peripheral surface of the ring body 61A together with foreign matter. Foreign matter can be prevented from being caught between the first raceway surface 11 of the outer ring 10 and the tapered rollers 30 or between the second raceway surface 211 of the inner ring 20 and the tapered rollers 30. Therefore, generation of abnormal sound and a reduction in the life of the tapered roller bearing 1 can be suppressed. The plurality of projecting portions 64 may extend not only in the axial direction but also in the circumferential direction.

That is, it is only necessary that the inner peripheral surface of the tubular portion of the lubricating oil holding member should be formed with recesses and projections. The recesses and projections which are formed in/on the inner peripheral surface of the tubular portion of the lubricating oil holding member hinder foreign matter that flows together with the lubricating oil J from flowing to the lower part of the tapered roller bearing. Therefore, generation of abnormal sound and a reduction in the life of the tapered roller bearing 1 can be suppressed.

In the tapered roller bearing 1, recesses and projections may not be formed in/on the inner peripheral surface of the ring body 61. Also in this case, the lubricating oil J which has adhered to the front surface 20a of the inner ring 20 can be efficiently collected in a space between the outer ring 10 and the lubricating oil holding member 50 in the lower part of the tapered roller bearing 1.

In the embodiment described above, the elastic lip 70 of the lubricating oil holding member 50 is positioned closer to the small rib 22, in the axial direction, than the front surface 20a of the inner ring 20. However, the present invention is not limited thereto. The elastic lip 70 of the lubricating oil holding member 50 may be positioned in the direction away from the small rib 22 in the axial direction with respect to the front surface 20a of the inner ring 20. The lubricating oil J is occasionally scattered toward one side in the axial direction when the lubricating oil J is further scattered radially outward from an end portion of the front surface 20a of the inner ring 20 on the outer side in the radial direction. The elastic lip 70 is disposed at a position away from the small rib 22 in the axial direction with respect to the front surface 20a of the inner ring 20. Consequently, the lubricating oil holding member 50 can collect lubricating oil scattered toward one side in the axial direction. Therefore, a reduction of the lubricating oil J can be further suppressed.

While an embodiment of the present invention has been described above, the embodiment discussed above is merely an example for implementation of the present invention. Hence, the present invention is not limited to the embodiment discussed above, and may be implemented by modifying the embodiment discussed above, as appropriate, without departing from the scope and spirit thereof.

With the tapered roller bearing according to the present disclosure, a reduction of lubricating oil stored in the lower part of the tapered roller bearing can be suppressed.

What is claimed is:

1. A tapered roller bearing comprising:
an outer ring;
an inner ring that includes a large rib and a small rib, the large rib being provided at an end portion of the inner ring on a first side of the tapered roller bearing in an axial direction to project radially outward, and the small rib being provided at an end portion of the inner ring on a second side of the tapered roller bearing in the axial direction to project radially outward;
a plurality of tapered rollers disposed between the outer ring and the inner ring;
a cage that holds the plurality of tapered rollers at intervals in a circumferential direction; and
a lubricating oil holding member provided on the first side, in the axial direction, of the outer ring and disposed at a position overlapping the large rib as seen in a radial direction, wherein:
the lubricating oil holding member includes
a tubular portion that extends in the axial direction and that is positioned at an end portion of the outer ring on the first side in the axial direction, and
an annular portion that extends radially inward from an end portion of the tubular portion on the first side in the axial direction;
the large rib includes an inclined surface which is disposed on an outer peripheral surface of the large rib at an end portion on the first side in the axial direction and a distance to which from a rotational axis of the inner ring becomes larger from a first end of the inclined surface at the first side in the axial direction to a second end of the inclined surface positioned toward the second side in the axial direction from the first end; and
the second end of the inclined surface is positioned, in the axial direction, between the annular portion and the end portion of the outer ring on the first side in the axial direction.

2. The tapered roller bearing according to claim 1, wherein
the annular portion is positioned, in the axial direction, toward the second side in the axial direction with respect to the end portion of the inner ring on the first side in the axial direction.

3. The tapered roller bearing according to claim 1, wherein the second end of the inclined surface is positioned, in the axial direction, between an end portion of the cage adjacent the first side in the axial direction and the annular portion.

4. The tapered roller bearing according to claim 1, wherein
an inner peripheral surface of the tubular portion is formed with recessed portions or projecting portions.

* * * * *